(12) United States Patent
Fowkes

(10) Patent No.: US 7,160,978 B2
(45) Date of Patent: Jan. 9, 2007

(54) AROMATIC AMIDE POLYMER SYSTEMS AND METHODS FOR MAKING THE SAME

(76) Inventor: Steven W. Fowkes, P.O. Box 4029, Menlo Park, CA (US) 94026

( * ) Notice: Subject to any disclaimer, the term of this patent is extended or adjusted under 35 U.S.C. 154(b) by 0 days.

(21) Appl. No.: 10/788,509

(22) Filed: Feb. 27, 2004

(65) Prior Publication Data

US 2004/0171756 A1    Sep. 2, 2004

Related U.S. Application Data

(60) Provisional application No. 60/450,302, filed on Feb. 27, 2003.

(51) Int. Cl.
*C08G 63/00* (2006.01)
(52) U.S. Cl. .................. 528/310; 428/411.1; 442/158; 525/178; 525/420; 528/310; 528/335
(58) Field of Classification Search ............. 525/178, 525/420; 528/310, 335; 442/158; 428/411.1
See application file for complete search history.

(56) References Cited

U.S. PATENT DOCUMENTS

| | | | |
|---|---|---|---|
| 3,893,956 A | 7/1975 | Brandt | 260/18 TN |
| 4,066,585 A | 1/1978 | Schepp et al. | 260/18 N |
| 4,385,170 A * | 5/1983 | Hirami et al. | 528/338 |
| 4,698,396 A | 10/1987 | Drawert et al. | 525/420.5 |
| 4,722,963 A | 2/1988 | Whyzmuzis | 524/606 |
| 4,758,639 A | 7/1988 | Koyanagi et al. | 526/62 |
| 4,820,765 A | 4/1989 | Whyzmuzis | 524/606 |
| 5,627,258 A | 5/1997 | Takayama et al. | 528/338 |
| 6,214,923 B1 * | 4/2001 | Goto et al. | 524/514 |
| 6,555,614 B1 | 4/2003 | Takanashi et al. | 524/589 |

FOREIGN PATENT DOCUMENTS

| | | | |
|---|---|---|---|
| JP | 2000273319 | * | 3/1999 |
| JP | 2001106909 | * | 10/1999 |
| WO | WO 9603114 | * | 7/1995 |

OTHER PUBLICATIONS

Hajipour, et al. Syntheesis and characterization of novel optically active polyamide-imide via diract amidation. Department of Pharmacology, Univ. 2005, (41)(10), abstract only.*
Macdonald et al. , Polymers from intermediates obtained from hydrogen cyaanide, Journal of Pollymer Science (1974, 12 (3) abstract only.*
Medhdipoour-Ataei et al.,Synthesis and characterization of novel heat resistant polyamide imides. European Polymer Journal (2005), 41 (9), abstract only.*

* cited by examiner

*Primary Examiner*—Terressa Boykin
(74) *Attorney, Agent, or Firm*—Haverstock & Owens LLP

(57) ABSTRACT

A method of making amide polymers with improved backbone rigidity, stability and/or planarity through the promotion of intra-molecular interactions is disclosed. Amide polymers, in accordance with the embodiments of the invention, are formed using aromatic dicarboxylic acids and heterocyclic diamine precursors or reactive amino-acid heterocyclic precursors. The heterocyclic precursors used in the present invention have heterocyclic structures that include hetero-atoms in a position that is beta relative to one or more reactive amine groups. Preferably, the hetero-atoms are nitrogen atoms. In accordance with further embodiments, precursors include functional groups that promote intermolecular interactions, intra-molecular interactions and/or enhance solubility of the amide polymers formed.

27 Claims, 11 Drawing Sheets

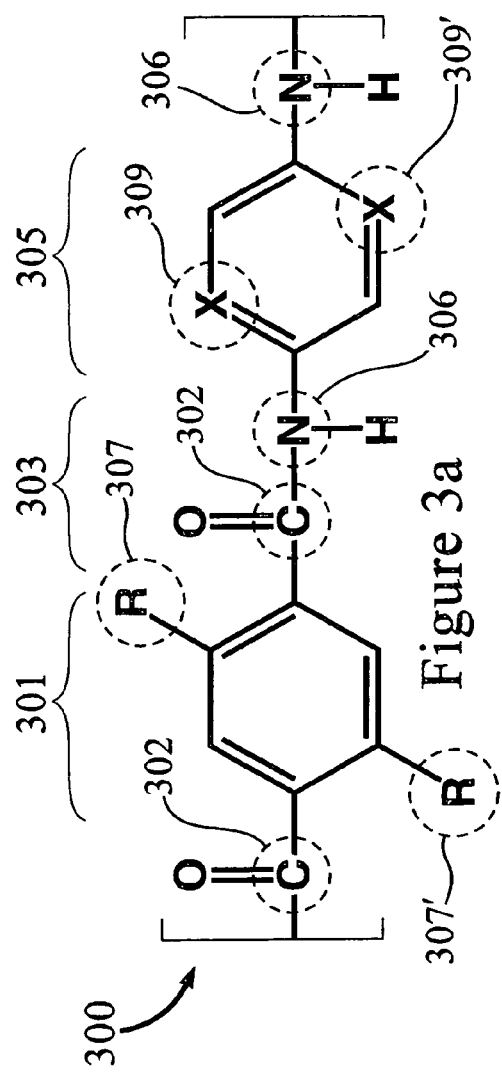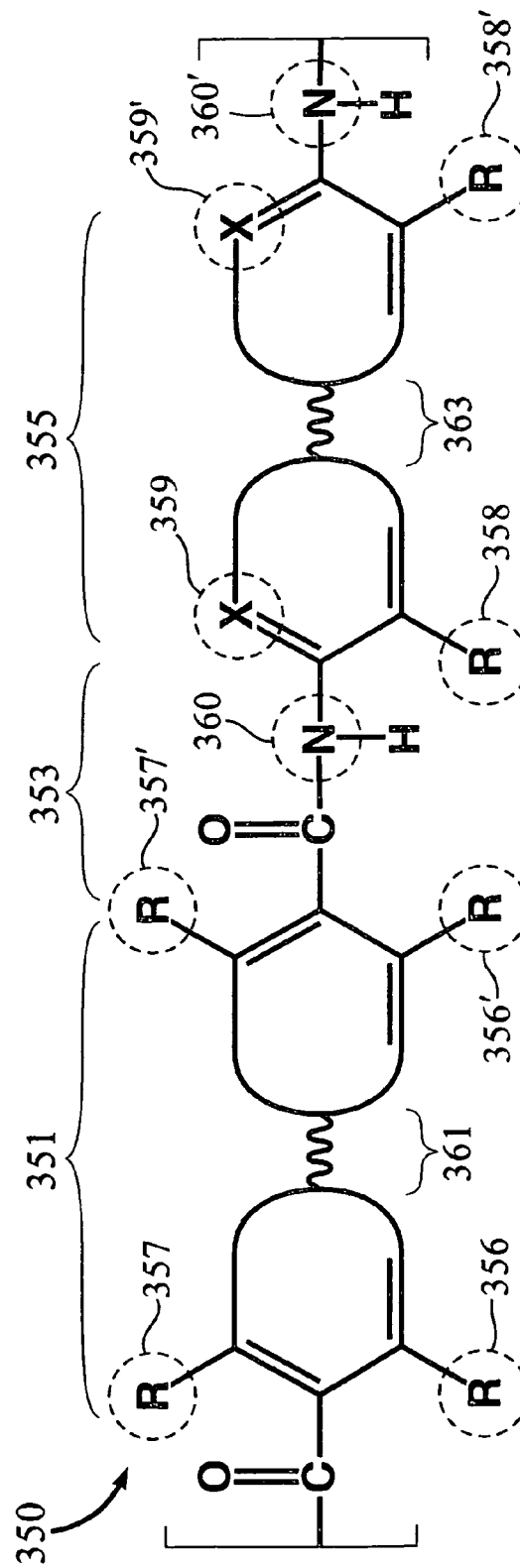
Figure 3a
Figure 3b

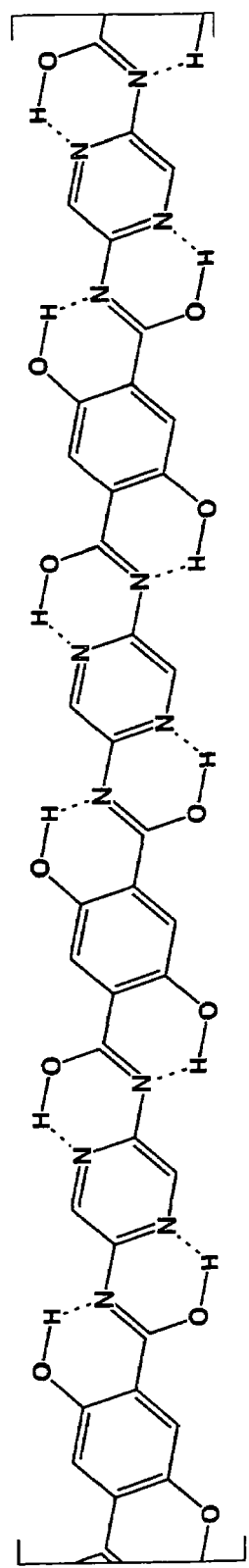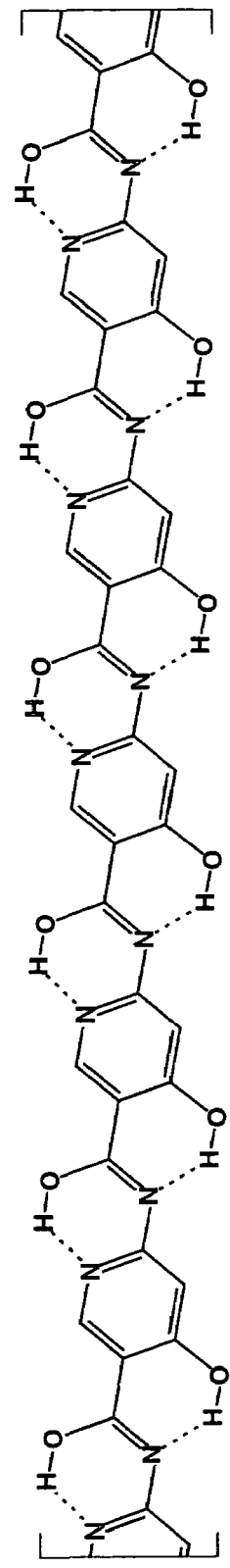
Figure 5a  
Figure 5b

Table 1: Examples of dicarboxylic acid monomers

| structure number | monomer chemical name |
|---|---|
| 1 | 2,3-dihydroxyterephthalic acid |
| 2 | 2,5-dihydroxyterephthalic acid |
| 3 | 4,6-dihydroxyisophthalic acid |
| 4 | 3,5-dihydroxy-2,6-napthalenedicarboxylic acid |
| 5 | 1,5-dihydroxy-2,6-napthalenedicarboxylic acid |
| 6 | 3,7-dihydroxy-2,6-napthalenedicarboxylic acid |
| 7 | 3,6-dihydroxy-2,7-napthalenedicarboxylic acid |
| 8 | 1,8-dihydroxy-2,7-napthalenedicarboxylic acid |

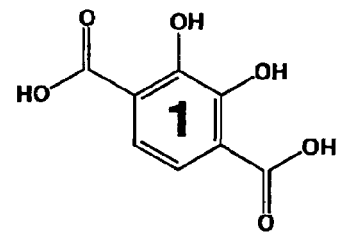
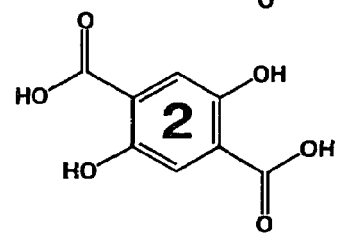
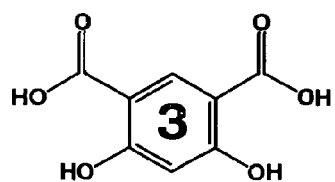
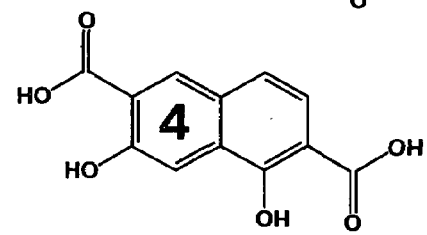
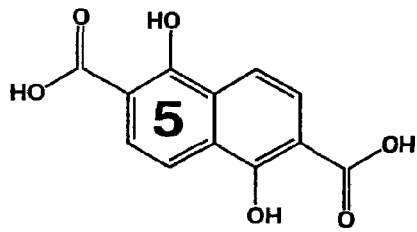
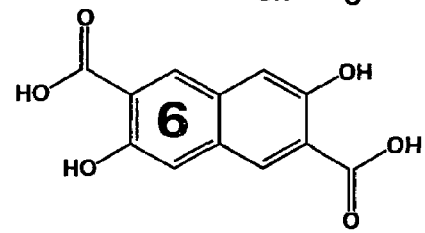
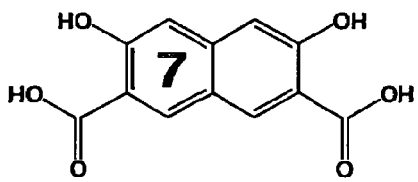
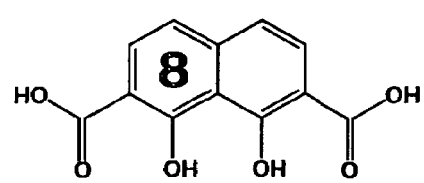

Figure 7

Table 2: Examples of diamino heterocyclic monomers

| structure number | monomer chemical name |
|---|---|
| 1 | 3,6-diaminopyridazine |
| 2 | 2,5-diaminopyrazine |
| 3 | 4,6-diaminopyrimidine |
| 4 | 1,4-diaminophthalazine |
| 5 | 2,6-diaminopyrido[3,4-b]pyridine |
| 6 | 2,6-diaminopyrido[2,3-b]pyridine |
| 7 | 3,6-diamino-[2,7-dibenzodiazine] |
| 8 | 3,7-diamino-[2,6-dibenzodiazine] |
| 9 | 2,6-diamino-[1,3,5-dibenzotriazine] |
| 10 | 2,6-diamino-[1,3,7-dibenzotriazine] |
| 11 | 2,6-diamino-[1,3,5,7-dibenzotetrazine] |
| 12 | 2,6-diaminopterin |
| 13 | 2,7-diaminonapthyridine |
| 14 | 2,5-diaminopyrido[4,3-b]-pyridine |
| 15 | 2,3-diaminopyrazine |
| 16 | 1,7-diaminopyrido[2,3-c]pyridine |

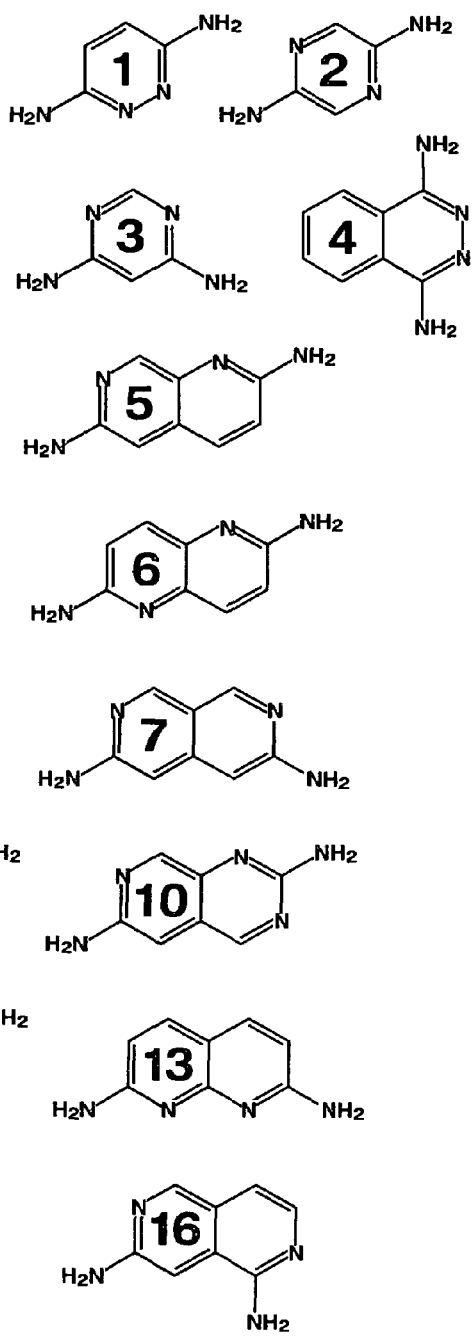

Figure 8

Table 3: Examples of amino-acid heterocyclic monomers

| structure number | monomer chemical name |
|---|---|
| 1 | 2-amino-3-carboxy-4-hydroxypyridine |
| 2 | 2-amino-5-carboxy-4-hydroxypyridine |
| 3 | 2-amino-5-carboxy-6-hydroxypyridine |
| 4 | 2-amino-4-carboxy-3-hydroxypyridine |
| 5 | 2-amino-4-carboxy-5-hydroxypyridine |
| 6 | 2-amino-6-carboxy-5-hydroxypyridine |
| 4a | 1-amino-6-carboxy-7-hydroxyisoquinoline |
| 4b | 1-amino-6-carboxy-7-hydroxy-2-azaanthracene |
| 4c | 3-amino-7-carboxy-6-hydroxy-2-azaphenanthrene |

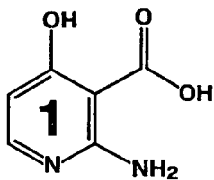
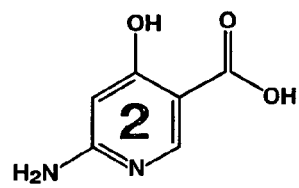
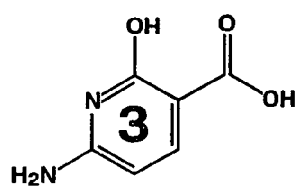
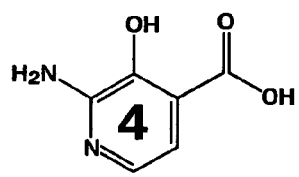
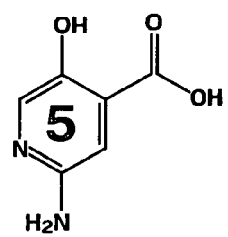
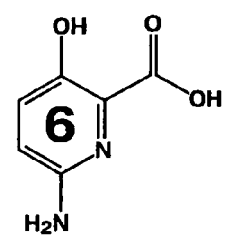
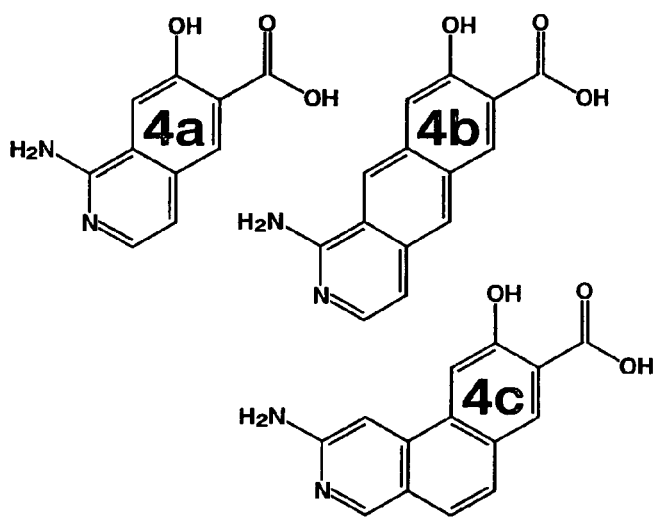

Figure 9

AROMATIC AMIDE POLYMER SYSTEMS AND METHODS FOR MAKING THE SAME

RELATED APPLICATION(S)

This Patent Application claims priority under 35 U.S.C. 119(e) of the co-pending U.S. Provisional Patent Application Ser. No. 60/450,302, filed Feb. 27, 2003, and titled "AROMATIC AMIDE POLYMERS AND METHOD FOR USE." The U.S. Provisional Patent Application Ser. No. 60/450,302, filed Feb. 27, 2003, and titled "AROMATIC AMIDE POLYMERS AND METHOD FOR USE" is hereby incorporated by reference.

FIELD OF THE INVENTION

This invention relates generally to polymer systems and methods for making polymers. More specifically this invention relates to amide polymers, amide polymer systems and methods for making the same.

BACKGROUND

Amide polymers are an important class of materials. A few of the most well know amide polymer systems include Nylon® and Kevlar®. Kevlar® is an aromatic polyamide, a class of materials commonly referred to as aramids. Aramids have a number of applications for making lightweight, high strength durable materials, including flame resistant materials, high impact resistant materials and chemically resistant materials. Kevlar® fibers, for example, can be mixed with resins and binders that are coated onto surfaces or are woven into fabrics to provide additional strength and durability to the surfaces or fabrics.

While the presently available polyamide materials have numerous uses and continue to show promise to advance the state of the art for highly durable materials, there are several shortcomings. Kevlar® fibers, for example, can be extremely difficult to separate due to a high degree of inter-molecular attraction that results from inter-molecular hydrogen bonding and stacking of the aromatic groups in these materials. Also, while there has been a tremendous amount of development in the area of making new polyamide materials, the compositions of materials that can be formed using traditional methods has been limited by structural considerations, such as discussed in detail below. Accordingly, there is a need to develop new methods of making polyamide materials that can span a larger range of compositions and physical properties and that can be tailored for specific applications.

SUMMARY OF THE INVENTION

The present invention is directed to amide polymers, polymer systems and methods for making the same. Amide polymers, in accordance with the embodiments of the present invention, can exhibit improved back-bone strength through enhanced double-bond character of the load-bearing back-bone and significant rigidity through the promotion of intra-molecular hydrogen bonding. Amide polymers can have aromatic structures and/or heterocyclic structures that are linked together through amide linkages or moieties. The amide linkages can be para, meta, and/or ortho positioned or oriented relative to each other. Para and meta oriented amide linkages alone are preferred for making extended linear structures and alternating para and meta amide linkages are preferred for making curved, circular, coiled or helical structures. Additional examples of two- and three-dimensional polymer arrays are disclosed in the Provisional Patent Application Ser. No. 60/547,731, titled "RIGID BACK-BONE POLYMERS AND POLYMER ARRAY", filed Feb. 24, 2004. The Provisional Patent Application Ser. No. 60/547,731, titled "RIGID BACK-BONE POLYMERS AND POLYMER ARRAY", filed Feb. 24, 2004, is hereby incorporated by reference.

In accordance with a preferred embodiment of the invention, at least a portion of the heterocyclic structures within a amide polymer have hetero-atoms positioned beta (two atoms a way) relative to nitrogen atoms that form the amide linkages. Nitrogen atoms are most preferred. Having hetero-atoms positioned beta relative to nitrogen atoms that form the amide linkages is believed to promote enol-like configurations of the amide linkages, which in turn promote intra-molecular hydrogen bonding and increase the strength, functionality and/or rigidity of the amide polymer backbone, as explained in detail below.

In accordance with further embodiments of the invention, aromatic structures and/or the heterocyclic structures of a amide polymer have functional groups positioned beta relative to amide linkages (bonded to an atom that is positioned two atoms form nitrogen atoms or carbon atoms that form the amide linkages). The functional groups preferably act as Lewis acid groups and absorb some electron density from a neighboring hetero-atom. The function groups can be hydrogen-containing functional groups that are capable of participating in hydrogen bonding as described below. Suitable hydrogen-containing functional groups include, but are not limited to, alcohol, thiol and amine functional groups. Having hydrogen containing functional groups positioned beta relative to the amide linkages is believed to further promote intra-molecular hydrogen bonding and further add to the stability and rigidity of the amide polymer backbone.

In accordance with the method of the invention, a amide polymer is formed by combining one or more aromatic dicarboxylic acid precursors with one or more heterocyclic mono or diamine precursors in a suitable solvent. Preferably, at least one of the heterocyclic diamine precursors includes hetero-atoms, such as nitrogen atoms, in positions that are beta relative to one or both of the reactive amine groups. Also, aromatic dicarboxylic acid precursors and the heterocyclic diamine precursors can include Lewis acid functional groups that are positioned beta relative to reactive carboxylic acid groups and/or reactive amine groups. As described above, Lewis acid functional groups can be hydrogen-containing functional groups include alcohol, thiol and amine functional groups and are believed to contributed to the rigidity of the resultant amide polymer formed therefrom.

The reactive groups are described as carbocyclic acid groups and amine groups. However, reactive groups is to encompass any carbocyclic acid derivative or amine derivative, including but not limited to acid anhydrides, acid halides, salts of acids, acid esters and amine salts. Also, while precursors are describe as having two reactive groups, it is understood that this in not intended to limit the precursors to two reactive groups. In fact precursors can have any number of reactive carbocyclic acid groups and/or amine groups.

In accordance with yet further embodiments of the invention, an amide polymer is formed by reacting one or more precursors comprising heterocyclic structures, wherein the heterocyclic structures have at least one reactive carboxylic group and at least one reactive amine group, referred to herein as heterocyclic amino-acid precursors. The heterocyclic structures include hetero-atoms, that are preferably nitrogen atoms, in positions that are beta relative to the nitrogen atoms of the reactive amine groups. As described above, the heterocyclic precursor can include Lewis acid functional groups that are positioned beta relative to the reactive carboxylic acid groups. In accordance with the method described above, only a single precursor is required to form a amide polymer in a "self-polymerization" process. However, any combination of precursors can be used. A polymerization process can be initiated using a catalyst, an acid, a base, heat, dehydration or a combination thereof. The actual reaction conditions required to initiate the polymerization process will depend on the precursor or precursors used.

Once the amide polymer is formed, the amide polymer can be isolated from unreacted precursors and/or a solvent and combined with any number of different materials to make composite materials. For example, an amide polymer can be combined with a binder material, such as epoxy, rubber, plastic, polyurethane and silicone, and/or can be coated onto a surface of a material, such as concrete, metal and ceramic. Further, fibers of a amide polymer can be packed into mono-filament thread and or woven into ropes, cables or fabric.

It will be clear from the discussion below that not all of the amide linkages in an amide polymer of the present invention need to be hydrogen bond-stabilized amide linkages. In fact, in some cases it may be preferred to make a amide polymer with a combination of traditional amide linkages and hydrogen bond-stabilized amide linkages. Also, amide polymers can be formed which include blocks of hydrogen bond-stabilized amide linkages that are separated by flexible blocks with or without amide linkages. Further, it is understood that aromatic structures and/or heterocyclic structures of the precursors and amide polymers formed therefrom can have any number of simple or complex structures. For example, the aromatic structures and/or heterocyclic structures can be multi-cyclic structures and/or extended structures and include any number of different functional groups

BRIEF DESCRIPTION OF THE FIGURES

FIG. 3a shows amide linkage linking an aromatic structure and a heterocyclic structure, in accordance with the embodiments of the invention.

FIG. 3b shows amide linkages linking aromatic structures and heterocyclic structures with extended structures, in accordance with the embodiments of the invention.

FIGS. 5a–d illustrate portions of amide polymers, in accordance the embodiments of the invention.

FIG. 7 is a Table that lists examples of dicarboxylic acid precursors used to make amide polymers, in accordance with a method of the present invention.

FIG. 8 is a Table that lists examples of diamine heterocyclic precursors used to make amide polymers, in accordance with the embodiments of the invention FIG. 9 is a Table that lists examples of carboxylic acid amine heterocyclic precursors used to make amide polymers, in accordance with the embodiments of the invention.

DETAILED DESCRIPTION

Figure 1:
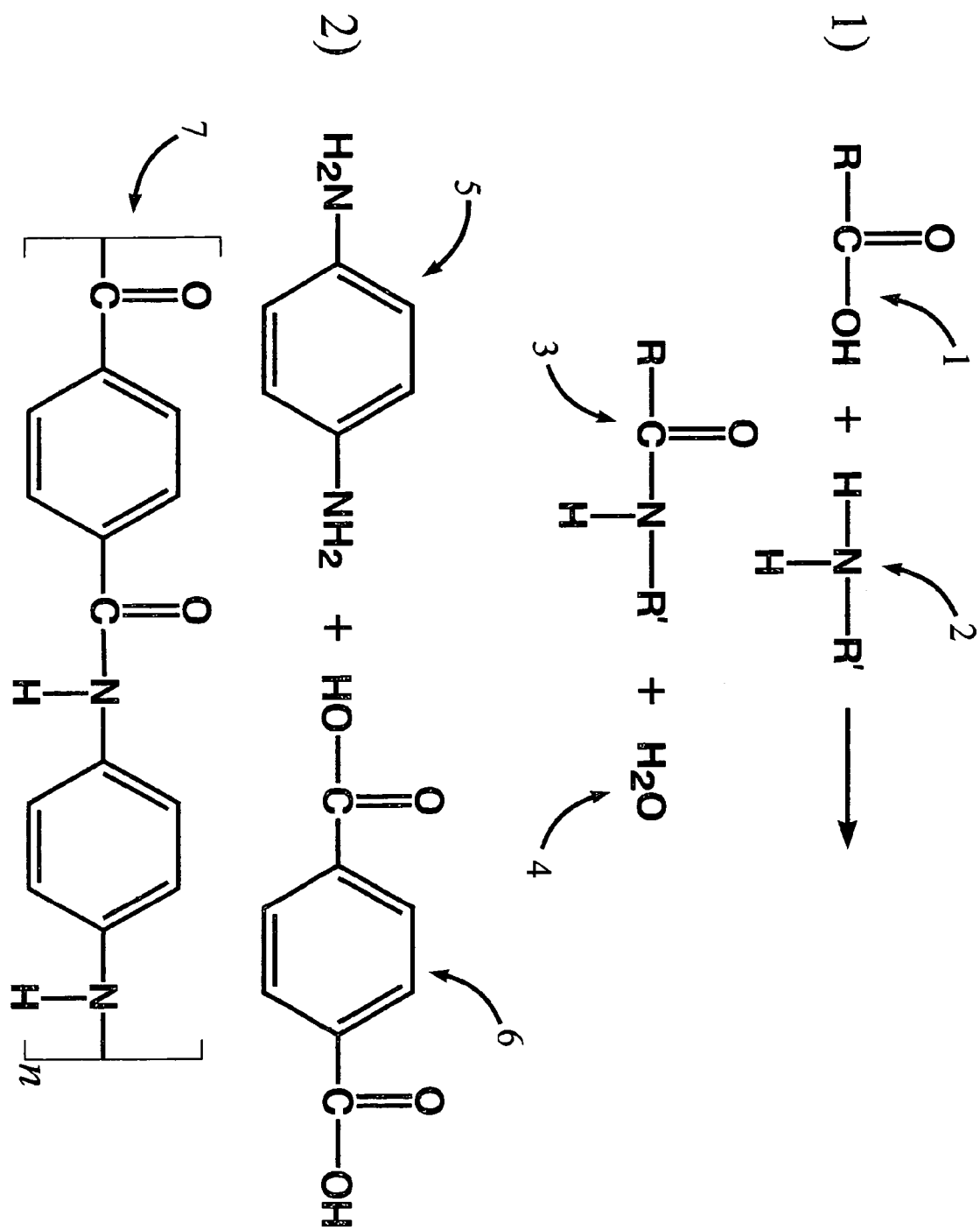
FIG. 1 shows reaction schemes for making amide linkages and polyamide linkages.

FIG. 1 shows reaction schemes 1) and 2) for making amide linkages and polyamide linkages, respectively. Referring to the reaction scheme 1), an amide moiety 3 can be formed by reacting a carboxylic acid 1 with a primary amide 2. A by product is usually water 4. The reaction scheme 1) is generally that same "type" of reaction that is used to form amide polymers. Referring to reaction scheme 2), a polyamide 7 can be formed by reacting an aromatic diamine processor 5 with an aromatic dicarboxylic acid precursor 6. The polyamide 7 formed usually will have and extended structure with aromatic groups that are linked through amide linkages. This is essentially how amide polymers, such as Kevlar®, are made.

Figure 2A:
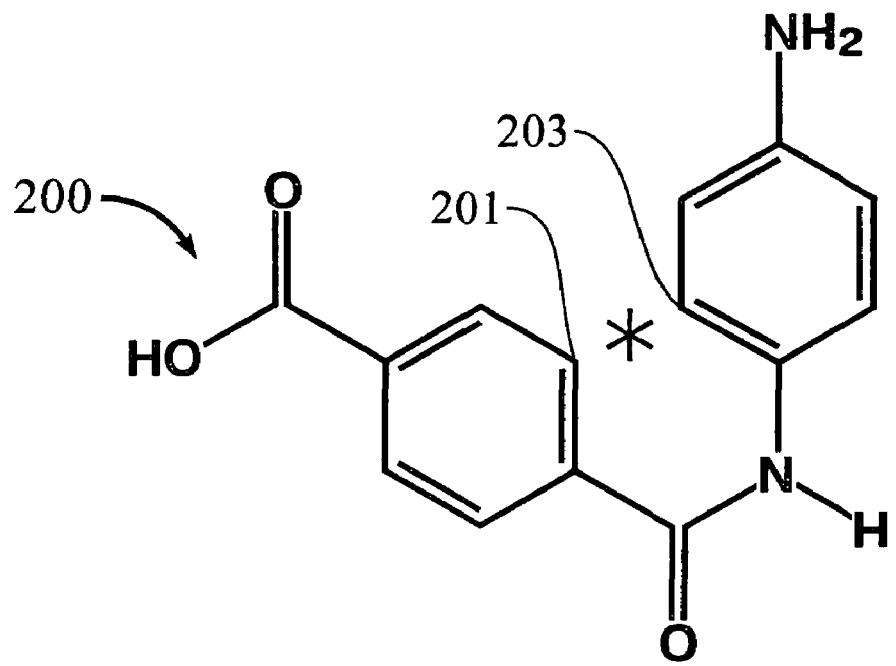
FIGS. 2a–b illustrate a trans-configuration and cis-configuration of organo-groups bonded through an amide linkage and the steric hindrance that can arise with the cis-configuration.
Figure 2B:
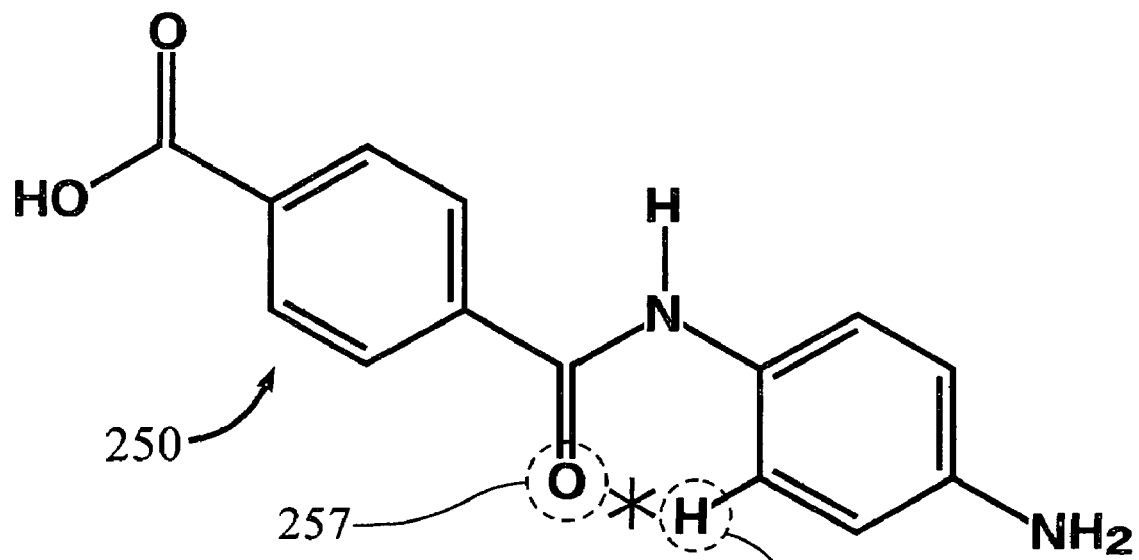

FIGS. 2a–b show dimer structures 200 and 250, respectively, that represent intermediate structures formed during a reaction of amide and carboxylic acid monomer precursors, such as described with reference to FIG. 1. FIG. 2a shows the dimer structure 200 having a cis-conformation with respect to an amine linkage. FIG. 2b shows the dimer structure 250 having a trans-conformation with respect to an amide linkage. The dimer structure 250 represents a 180 degree rotation of the dimer structure 200 through the nitrogen-carbon bond that forms the amide linkage.

Due to the many desirable features that can result from increases of aromaticity in polymers, it is desirable that adjacent aromatic rings be able to lie in a coplanar conformation. However, due to steric conflicts in standard aramid polymer structure, neither the "cis" (FIG. 2a) nor "trans" (FIG. 2b) conformations are favored. The cis-conformation 200 shows an extreme conflict between ring carbon atoms 201 and 203 and a superimposition of their attached hydrogen atoms, both of which make the cis structure impossible. The trans conformation 250 shows a steric crowding between one ring hydrogen atom 253 and the amide oxygen 257, which make ring coplanarity energetically unfavorable. The steric hindrance, and hence the structural limitations imposed by steric hindrance, can be reduced or eliminated by replacing an offending hydrogen-bearing carbon atom within the aromatic ring with a hetero-atom, as explained in detail below. Beside the cis- and trans-configurations described above, there are a number of other important factors in determining the structure of a polymer formed by the reaction of monomer precursors such as elements 5 and 6 in FIG. 1. The relative positions of the reactive carboxylic groups and the reactive amine groups on the aromatic rings are also extremely important in determining the outcome of the extended polymer structure that is formed. The diamine precursor 5 and the aromatic dicarboxylic acid precursor 6 both have their reactive amine groups and reactive carboxylic acid groups para and the resultant amide polymer 7 has only para-linkages. The result is quite different when the monomer precursors have reactive groups that are positioned meta, ortho, or a combination of para and meta, such as illustrated in FIGS. 5a–d and FIGS. 6a–b.

The present invention utilizes at least one precursor that includes a hetero-atom located at positions that are beta relative to the nitrogen atom of the reactive amine groups. Accordingly, the amide polymer that is formed includes hetero-atoms that are in positions beta relative to nitrogen atoms that form the amide linkages. Taking advantage of the belief that such structures can promote intra-molecular stabilization of the amide polymer back-bone, and further by judicious choice of the precursors, a wide variety of amide polymer structures are envisioned. Also, it believed that the inclusion of Lewis acid groups, such as hydrogen containing groups, that are positioned beta relative to the amid linkages can further promote intra-molecular hydrogen bonding and further stabilize the back-bone of the amide polymer. Accordingly, the following examples are provided by way of illustration and any number of other related amide polymer structures are considered to be within the scope of the present invention.

FIG. 3a shows section of a polyamide 300 with an amide linkage 303 linking an aromatic structure 301 and a heterocyclic structure 305. In accordance with the embodiments of the invention, the heterocyclic structure 305 has heteroatoms 309 and 309' that are positioned beta relative to the nitrogen atoms 306 that from amide linkages, such the amide linkage 303. There are potentially two positions that are beta to each of the amide nitrogen atoms 306, and a hetero-atom can be located at either or both positions. The hetero-atoms 309 and 309' are preferably nitrogen atoms, but can be phosphorus atoms or other hetero atoms that are stable within the heterocyclic ring structure, such as 305. Still referring to FIG. 3a, and in accordance with further embodiments of the invention, the aromatic structure 301 includes one or more Lewis acid groups, such as hydrogen containing groups 307 and 307' that are positioned beta relative to the carbon atoms 302 the form amide linkages, such as the amide linkage 303. There are also two positions that are beta to the carbon atoms 302, either or both of which can have Lewis acid groups such as hydrogen-containing groups. The hydrogen-containing functional groups 307 and 307' can promote intra-molecular hydrogen bonding, such as illustrated in FIGS. 4c–d below. Suitable hydrogen-containing functional groups 307 and 307' include, but are not limited to, alcohol functional groups, thiol functional groups and amine functional groups.

FIG. 3b illustrates a section of a polyamide structure 350, in accordance with further embodiments of the invention. As described with reference to FIG. 3a, the polyamide structure 350 includes an aromatic and/or heterocyclic structure 351 and a heterocyclic structure 355 that are linked through an amide linkage 353. The heterocyclic structure 355 preferably has hetero-atoms 359 and 359' that are positioned beta relative to nitrogen atoms 360 and 360' that form amide linkages, such as the amide linkage 353. Again, the heteroatoms 359 and 359' are preferably nitrogen atoms, but can be other hetero-atoms.

Still referring to FIG. 3b, the aromatic structure 351 and/or the heterocyclic structure 355 can include one or more other organo-functional groups 356, 356', 358 and 358', such as alcohol functional groups or thiol functional groups, that enhance the solubility of the polyamide structure 350 in a solvent, such as water, promote inter-molecular bonding, such as cross-linking and/or promote intra-molecular bonding, such as hydrogen bonding, such as illustrated in FIGS. 4c–d. Further, the aromatic structure 351 and/or heterocyclic structure 355 can be multi-cyclic structures and/or have extended linking moieties 361 and 363 that are positioned between linking portions of aromatic structure 351 and/or heterocyclic structure 355. Other functional groups 356, 356', 358 and 358', such as metal-containing functional groups and or reactive groups are also envisioned.

Figure 4A:
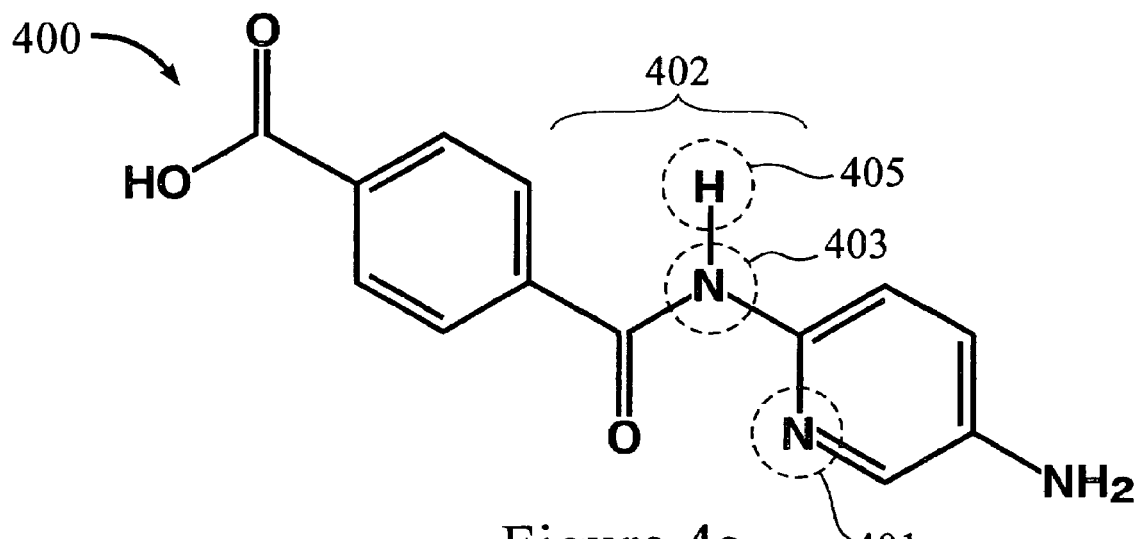
FIGS. 4a–b illustrate a keto-like configuration of an amide linkage and an enol-like configuration of the amide linkage, respectively.
Figure 4B:
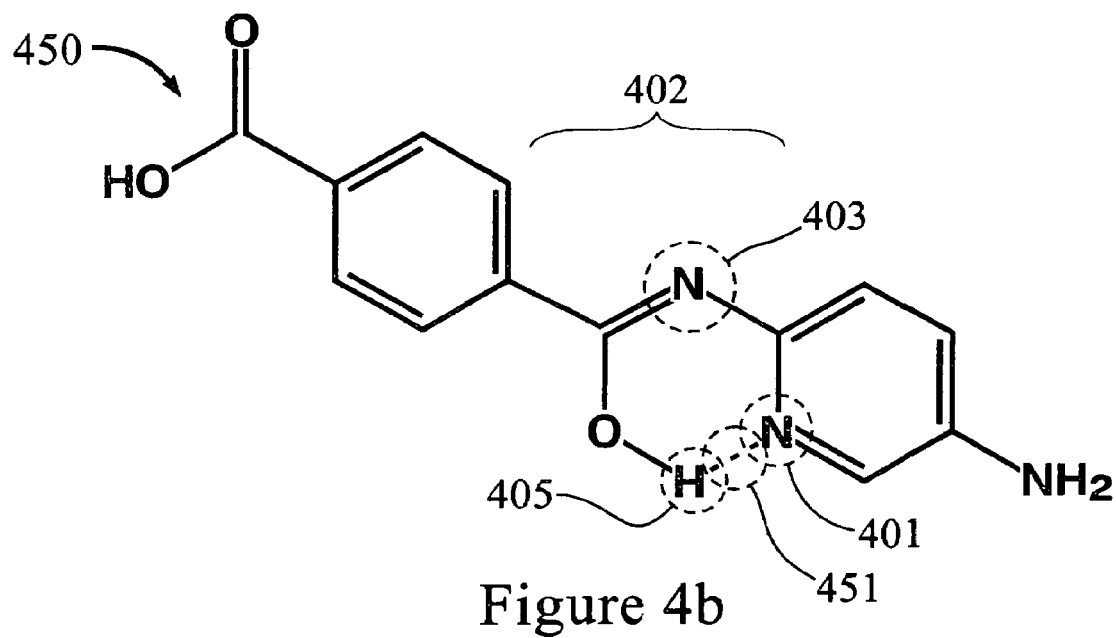
Figure 4C:
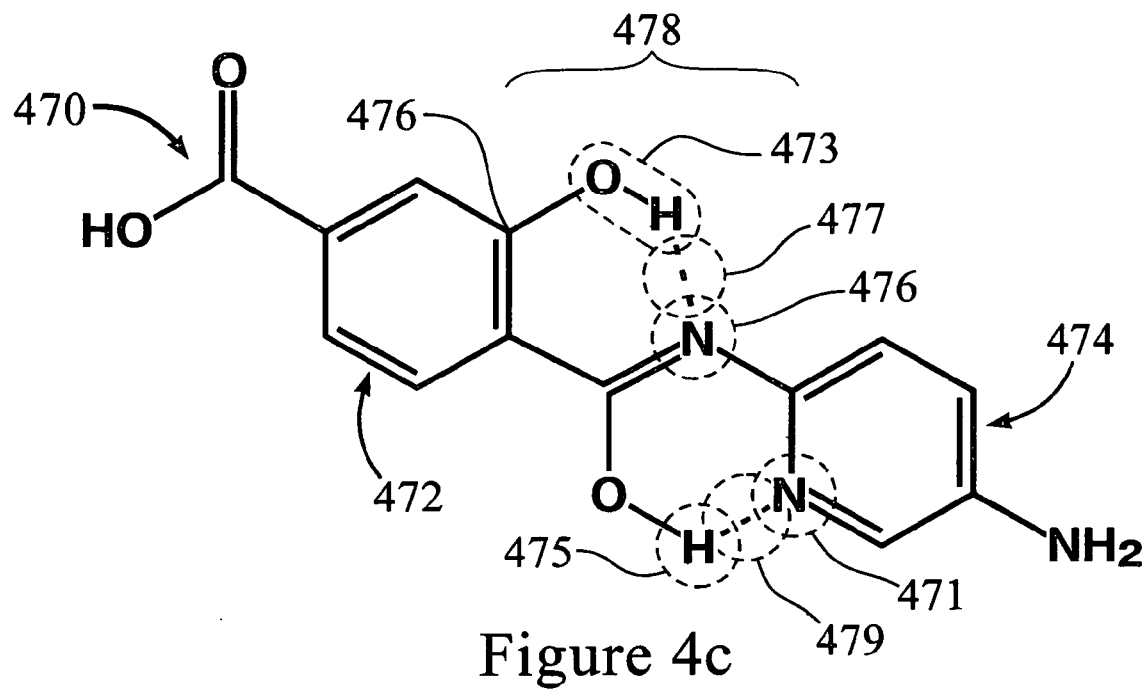
FIGS. 4c–d illustrate amide linkages that are hydrogen bond stabilized by hydrogen-containing functional groups in positions that are beta relative to the amide linkages, in accordance with further embodiments of the invention.
Figure 4D:
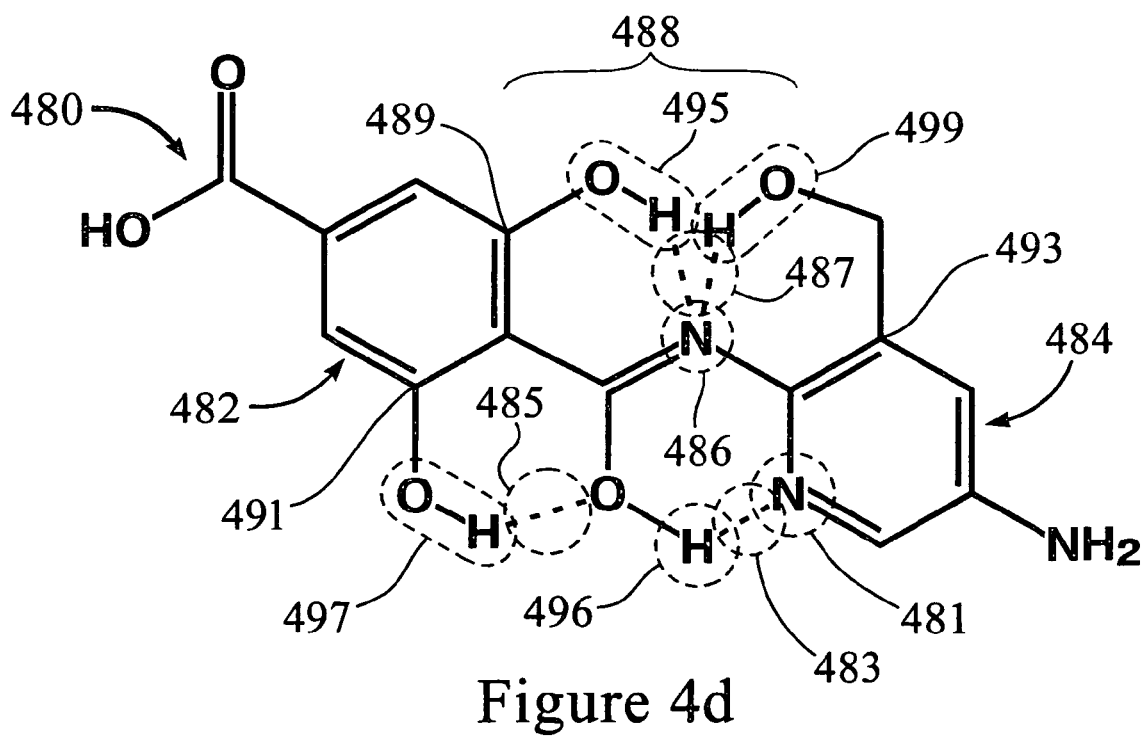

FIGS. 4a–b illustrate a keto-configuration 400 and an enol-configuration 450, respectfully, of the hetero-modified amide linkage 402, in accordance with the present invention. With the presence of a hetero-atom 401, such as a nitrogen atom, that is positioned beta relative to the nitrogen atom 403 that forms the amide leakage 402, the enol-configuration 450 of the amide linkage 402 can be a more important resonance structure and, in fact, can be the preferred tautomer. The enol-configuration 450 of the amide linkage 402 can promote hydrogen bonding as indicated by the dotted line 451 between an enol-hydrogen atom 405 and the hetero-atom 401. It is believed that such hydrogen bonding 451 promotes coplanarity of the heterocyclic ring system 454 and the amide linkage 402, and even the aromatic ring system 457, and increases the double-bond character of the amide carbon-nitrogen bond 459, and thereby provides rigidity and/or stability to the back-bone of an extended polyamide structure having amide linkages, such as 402.

FIG. 4c illustrates an enol-configuration 470 of an amide linkage 478 with an aromatic structure 472 and a heterocyclic structure 474 similar to that described above with reference to FIG. 4b. Again there is hetero-atom 471, such as a nitrogen atom, that is positioned beta relative to the nitrogen atom 476 that forms the amide leakage 478. The enol-configuration 470 can promote hydrogen bonding 479 between the enol-hydrogen atom 475 and the hetero-atom 471. In addition, the enol-configuration 470 can have a hydroxyl group or alcohol functional group 473 that is positioned beta 476 on the aromatic structure 472 relative to the amide linkage 478. It is believed that hydroxyl groups, such as the hydroxyl group 473, can contribute to hydrogen bonding to the nitrogen atom 476 that forms the amide linkage 478, as indicated by the dotted line 477. The hydrogen bonding 477 is believed to further stabilize the amide linkage 478 and add to the rigidity and/or stability of an extended polyamide structures having amide linkages, such as 478.

Further expanding on the principles discussed above, FIG. 4d illustrates an enol-configuration 480 with additional hydrogen bonding that can occur through hydrogen-containing functional groups. The enol-configuration 480 has an aromatic structure 482 and a heterocyclic structure 484 linked through an amide linkage 488. The heterocyclic structure 484 has a hetero-atom 481, such as a nitrogen atom, that is positioned beta relative to the nitrogen atom 486 that forms the amide linkage 488. The enol-configuration 480 can promote hydrogen bonding 483 between the enol-hydrogen atom 496 and the hetero-atom 481. In addition, the enol-configuration 480 includes hydroxyl groups or alcohol functional groups 495 and 497 that are positioned beta 489 and 491 on the aromatic structure 482 relative to the amide linkage 488. Also, the enol-configuration 480 can include a hydroxyl group or an alcohol functional group 499 that is part of an alpha-hydroxyl substituted alkyl group in the meta position 493 of the heterocyclic structure 484 and positioned ortho 493 on the heterocyclic structure 484 and relative to the amide linkage 488. Potentially, all of the hydroxyl groups 495, 497 and 499 can be involved in hydrogen bonding as indicated by the dotted lines 485 and 487, which can further stabilize the amide linkage 488 and add to the rigidity and/or stability of an extended polyamide structures having amide linkages, such as the amide linkage 488.

Figure 5C:
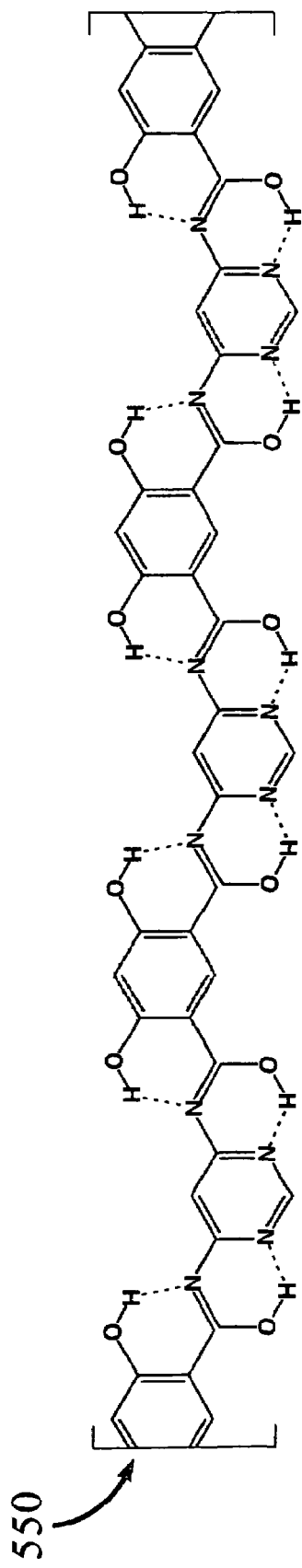

FIGS. 5a–d illustrate portions of amide polymers formed from simple monomer precursors. FIG. 5a shows a portion of an amide polymer 500 that can be formed by combining an aromatic dicarboxylic acid precursor and a heterocyclic diamine precursor. The aromatic dicarboxylic acid precursor used to form the amide polymer 500 has reactive carboxylic acid groups that are positioned para with respect to each other on an aromatic ring and the heterocyclic diamine precursor used to form the amide polymer 500 has reactive amine groups that are positioned para with respect to each other on a heterocyclic ring.

FIG. 5b shows a portion of a amide polymer 525 that can be derived from a heterocyclic amino-acid precursor by a self-polymerization process. The heterocyclic amino acid precursor used to form the amide polymer 525 has a reactive carboxylic acid group and a reactive amine group that are positioned para with respect to each other on a heterocyclic ring.

FIG. 5c shows a portion of amide polymer 550 that can be formed by combining an aromatic dicarboxylic acid precursor and a heterocyclic diamine precursor. The aromatic dicarboxylic acid precursor used to form the amide polymer 550 has reactive carboxylic acid groups that are positioned meta with respect to each other on a aromatic ring and the heterocyclic diamine precursor used to form the amide polymer 550 has reactive amines groups that are positioned meta with respect to each other on a heterocyclic ring.

Figure 5D:
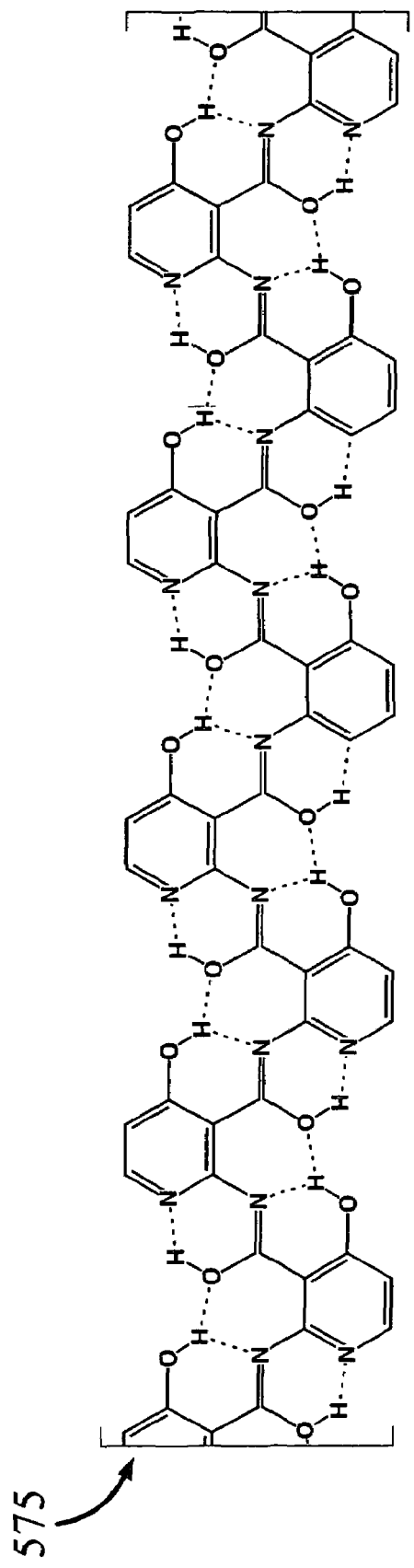

FIG. 5d shows a portion of a amide polymer 575 that can be derived from a heterocyclic amino acid precursor by a self-polymerization process. The heterocyclic amino acid precursor used to form the amide polymer 575 has a reactive carboxylic acid group and a reactive amine group that are positioned ortho with respect to each other on a heterocyclic ring.

Figure 6B:
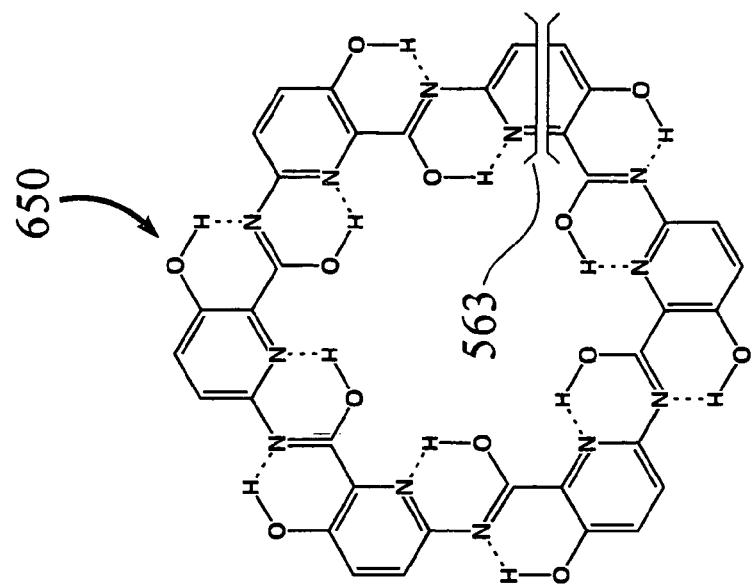
FIGS. 6a–b illustrate portions of two-dimensional and three-dimensional polyamide structures, in accordance with the embodiments of the invention.
Figure 6A:
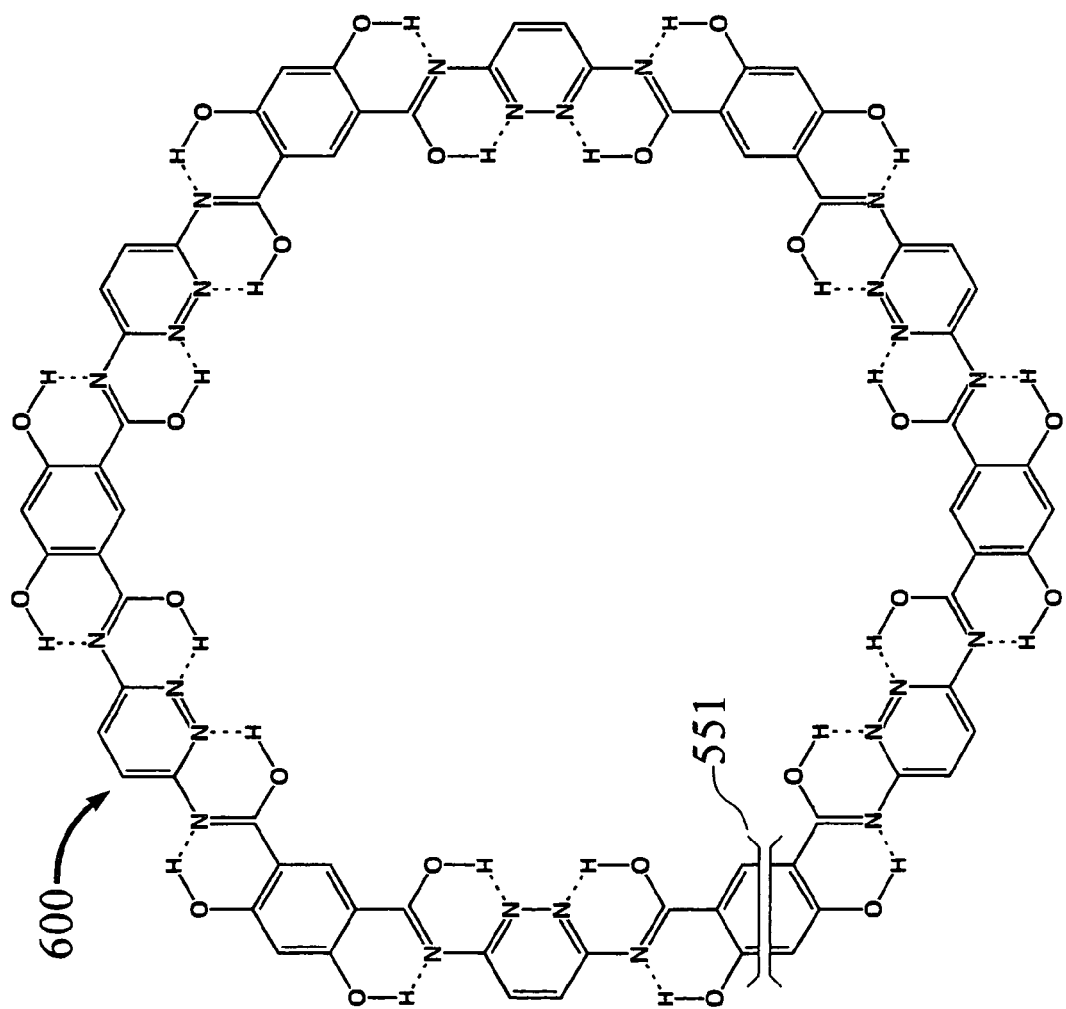

FIG. 6a shows a portion of amide polymer 600 that has substantial curvature resulting from a combination of alternating meta-orientated dicarboxylic monomer and para-orientated diamine heterocyclic monomers. The amide polymer 600 circles around to a point 551 where the amide polymer 600 can terminate or, alternatively, can continue to extend in a spiral or helical fashion.

FIG. 6b shows a portion of a amide polymer 650 that exhibits even greater curvature than the polymer 600. Polymer 650 results from the self-polymerization of a heterocyclic amino-acid monomer. In this case, carboxylic acid group is positioned meta relative to the a reactive amine group. Amide polymer 650 formed by the reaction described above can circle around to a point 563 where the amide polymer 650 can terminate or, alternatively, can extend in a spiral or helical fashion.

FIG. 7 shows Table 1 listing formulae and corresponding structures of suitable dicarboxylic acid precursors used to make amide polymers, in accordance with the method of the present invention. For example, amide polymers can be formed using one or more of 1) 2,3-dihydroxyterephthalic acid; 2) 2,5-dihydroxyterephthalic acid; 3) 4,6-dihydroxy-isophthalic acid; 4) 3,5-dihydroxy-2,6-napthalenedicarboxylic acid; 5) 1,5-dihydroxy-2,6-napthalenedicarboxylic acid; 6) 3,7-dihydroxy-2,6-napthalenedicarboxylic acid; 7) 3,6-dihydroxy-2,7-napthalenedicarboxylic acid; and 8) 1,8-dihydroxy-2,7-napthalenedicarboxylic acid precursors.

FIG. 8 shows Table 2 listing formulae and corresponding structures of suitable diamine heterocyclic precursors that can be used to make amide polymers, in accordance with the embodiments of the invention. For example, amide polymers can be formed using one or more of 1)3,6-diaminopyridazine; 2) 2,5-diaminopyrazine; 3) 4,6-diaminopyrimidine; 4) 1,4-diaminophthalazine; 5) 2,6-diaminopyrido[3,4-b]pyridine; 6) 2,6-diaminopyrido[2,3-b]pyridine; 7) 3,6-diamino-[2,7-dibenzodiazine]; 8) 3,7-diamino-[2,6-dibenzodiazine]; 9) 2,6-diamino-[1,3,5-dibenzotriazine]; 10) 2,6-diamino-[1,3,7-dibenzotriazine]; 11) 2,6-diamino-[1,3,5,7-dibenzotetrazine]; 12) 2,6-diaminopterin; 13) 2,7-diaminonapthyridine; 14) 2,5-diaminopyrido[4,3-b]-pyridine; 15) 2,3-diaminopyrazine; and 16) 1,7-diaminopyrido[2,3-c]pyridine precursors.

FIG. 9 shows Table 3 listing formulae and corresponding structures of suitable heterocyclic carboxylic acid amine precursors that can be used to makes amide polymers, in accordance with the embodiments of the invention. For example, amide polymers can be formed using one or more of 1) 2-amino-3-carboxy-4-hydroxypyridine; 2) 2-amino-5-carboxy-4-hydroxypyridine; 3) 2-amino-5-carboxy-6-hydroxypyridine; 4) 2-amino-4-carboxy-3-hydroxypyridine; 5) 2-amino-4-carboxy-5-hydroxypyridine; 6) 2-amino-6-carboxy-5-hydroxypyridine; 4a) 1-amino-6-carboxy-7-hydroxyisoquinoline; 4b) 1-amino-6-carboxy-7-hydroxy-2-azaanthracene; and 4c) 3-amino-7-carboxy-6-hydroxy-2-azaphenanthrene precursors.

The precursors listed in Tables 1–3 are exemplary only and any number of modified or related precursors are considered to be within the scope of the invention. For example, precursors can include alcohol functional groups to enhance inter-molecular, intra-molecular bonding and/or to increase the solubility of the resultant polyamide in a solvent, such as water. Further, the precursors can themselves be extended structures. For example, while the precursors have been discussed above as monomer precursors, dimers and trimers can be used as precursors in some instances.

The present invention utilizes at least one precursor with a heterocyclic structure that includes hetero-atoms located at positions that are beta relative to the nitrogen of reactive amine groups for generating corresponding polyamides. The heterocyclic precursor can be reacted alone or combined with other precursors that are heterocyclic precursors or aromatic precursors. The precursors can include Lewis acid groups, such as hydrogen containing functional groups capable of participating in hydrogen bonding and can be used to generate a variety of novel amide polymers with stabilized back-bone structures. Once these novel amide polymers are formed they can be used in a number of different ways. For example, amide polymers can be combined with a binder materials, coated onto surfaces and/or woven into a fabric material.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention. For example, precursors and polymers made therefrom can includes any number of reactive and functional groups.

What is claimed is:

1. A composite material comprising a polymer with an amide back-bone structure represented by the formula [-Ht(OH)—C(OH)=N—]n, wherein Ht are heterocycles comprising hetero-atoms with the hetero-atoms being positioned beta relative to nitrogen atoms forming amide linkages forming the amide back-bone structure.

2. The composite material of claim 1, wherein the amide back-bone is substantially represented by the structure:

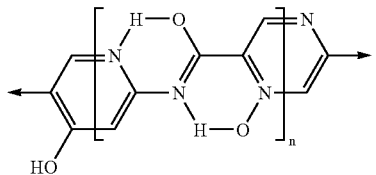

3. The composite material of claim 1, wherein the hetero-atoms are nitrogen.

4. The composite material of claim 1, wherein the heterocyclic structures comprise an alcohol functional group that is positioned beta to at least a portion of the amide linkages.

5. The composite material of claim 1, wherein the aromatic structures comprise one or more function groups positioned beta relative to at least a portion of the amide linkages, the one or more functional group being selected from a group consisting of an alcohol functional group, a thiol functional group and an amine functional group.

6. The composite material of claim 1, wherein aromatic structures include bicyclic sub-structures.

7. The composite material of claim 1, further comprising a binder material.

8. The composite material of claim 7, wherein the binder material comprises one or more materials selected from a group consisting of epoxy, rubber, plastic, polyurethane and silicone.

9. The composite material of claim 2, wherein the amide linkages are positioned para between the aromatic structures and the heterocyclic structures.

10. A method for making a polymer composite material comprising:
  a) reacting a carboxylic acid precursor and an amine precursor in a suitable solvent to form an aromatic polyamide, wherein the carboxylic acid precursor comprises an aromatic structure and two reactive carboxylic acid groups and the amine precursor comprises a heterocyclic structure and two reactive amine groups and wherein the heterocyclic structure comprises a hetero-atom in a beta position relative to one or more of the reactive amine groups; and
  b) isolating the aromatic polyamide, wherein the aromatic polyamide has a formula substantially represented by [-Ht(OH)—C(OH)=N—]n or [—(OH)Ar(OH)—C(OH)=N—Ht-N=C(OH)—]n wherein Ar are aromatic moieties and Ht are heterocycles comprising hetero-atoms with the hetero-atoms being positioned beta relative to nitrogen atoms forming amide linkages forming an amide back-bone structure of the polymer composite material.

11. The method of claim 10, wherein the hetero-atom is a nitrogen.

12. The method of claim 10, wherein the aromatic carboxylic acid precursor comprises a functional group positioned beta to one or more the reactive carboxylic acid groups, wherein the one or more functional groups are selected from a group consisting of an alcohol functional group, a thiol functional group and an amine functional group.

13. The method of claim 10, wherein the heterocyclic amine precursor comprises a functional group positioned beta to the one or more of the reactive amine groups, wherein the functional group is selected from a group consisting of an alcohol functional group, a thiol functional group and an amine functional group.

14. The method of claim 10, wherein the two reactive carboxylic acid groups are positioned para to each other on the aromatic structure.

15. The method of claim 10, wherein the reactive amine groups are positioned para relative to each other on the heterocyclic structure.

16. The method of claim 10, further comprising incorporating the aromatic polyamide in a binder material.

17. The method of claim 16, wherein the binder material is selected from a group consisting of epoxy, rubber, plastic, polyurethane and silicone.

18. The method of claim 10, further comprising integrating the aromatic polyamide into a fabric material.

19. A composite material comprising a polymer with an amide back-bone structure represented by the formula [—(OH)Ar(OH)—C(OH)=N-Ht-N=C(OH)—]n, wherein Ar are aromatic moieties and Ht are heterocycles comprising hetero-atoms with the hetero-atoms of the heterocycles being positioned beta relative to nitrogen atoms forming amide linkages forming the amide back-bone structure.

20. The composite material of claim 1, wherein the amide back-bone is substantially represented by at least on of the structures A–C:

A)

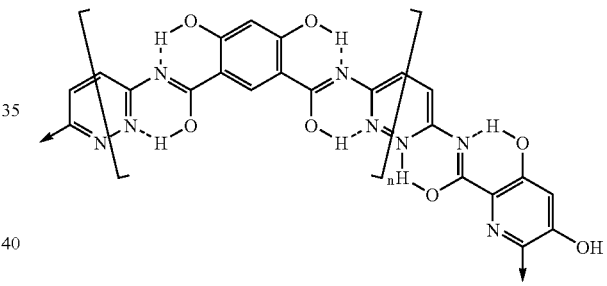

B)

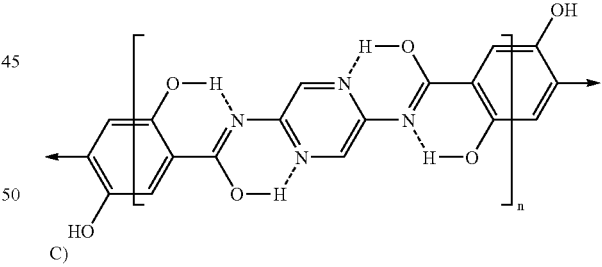

C)

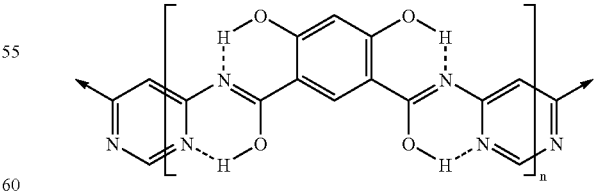

21. The composite material of claim 19, wherein the hetero-atoms are nitrogen.

22. The composite material of claim 19, wherein the heterocyclic structures comprise an alcohol functional group that is positioned beta to at least a portion of the amide linkages.

23. The composite material of claim 19, wherein the aromatic structures comprise one or more function groups positioned beta relative to at least a portion of the amide linkages, the one or more functional group being selected from a group consisting of an alcohol functional group, a thiol functional group and an amine functional group.

24. The composite material of claim 19, wherein aromatic structures include bicyclic sub-structures.

25. The composite material of claim 19, further comprising a binder material.

26. The composite material of claim 19, wherein the binder material comprises one or more materials selected from a group consisting of epoxy, rubber, plastic, polyurethane and silicone.

27. The composite material of claim 19, wherein the amide linkages are positioned para between the aromatic structures and the heterocyclic structures.

* * * * *

UNITED STATES PATENT AND TRADEMARK OFFICE
CERTIFICATE OF CORRECTION

| | | |
|---|---|---|
| PATENT NO. | : 7,160,978 B2 | Page 1 of 1 |
| APPLICATION NO. | : 10/788509 | |
| DATED | : January 9, 2007 | |
| INVENTOR(S) | : Steven W. Fowkes | |

It is certified that error appears in the above-identified patent and that said Letters Patent is hereby corrected as shown below:

In the Specification

In Column 2, at Line 53, under SUMMARY OF THE INVENTION, please replace "is" with --are--.

In Column 2, at Line 57, under SUMMARY OF THE INVENTION, please replace "describe" with --described.--

In the Claims

In Column 10, Claim 20, at Line 26, please replace "on" with --one.--

Signed and Sealed this

Sixth Day of March, 2007

JON W. DUDAS
*Director of the United States Patent and Trademark Office*